US008267323B2

(12) United States Patent
Studer et al.

(10) Patent No.: US 8,267,323 B2
(45) Date of Patent: Sep. 18, 2012

(54) PRINTING DEVICE HANDLE

(75) Inventors: Anthony D. Studer, Albany, OR (US); John A. Devos, Corvallis, OR (US); William E. Lewey, Albany, OR (US); Suzanne Spencer Middleton, Corvallis, OR (US); Dennis A. Iverson, Corvallis, OR (US); Jeffrey J. Buresh, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 892 days.

(21) Appl. No.: 12/248,387

(22) Filed: Oct. 9, 2008

(65) Prior Publication Data

US 2009/0109271 A1 Apr. 30, 2009

Related U.S. Application Data

(60) Provisional application No. 60/983,145, filed on Oct. 26, 2007.

(51) Int. Cl.
*G06K 7/10* (2006.01)

(52) U.S. Cl. .................................................. 235/472.01

(58) Field of Classification Search ..................... 235/472.01–472.03; 347/109; D18/14
See application file for complete search history.

(56) References Cited

U.S. PATENT DOCUMENTS

| | | | | |
|---|---|---|---|---|
| 4,819,083 | A | 4/1989 | Kawai et al. | |
| 4,983,818 | A | 1/1991 | Knowles | |
| D338,412 | S * | 8/1993 | Curbbun | D10/57 |
| 5,349,497 | A | 9/1994 | Hanson | |
| 5,477,044 | A * | 12/1995 | Aragon | 235/472.01 |
| 5,726,434 | A * | 3/1998 | Seo | 235/462.11 |
| 5,953,497 | A | 9/1999 | Kokubo et al. | |
| 5,996,896 | A | 12/1999 | Grabon | |
| 6,109,528 | A | 8/2000 | Kunert et al. | |
| 6,299,067 | B1 | 10/2001 | Schmidt et al. | |
| 340,115 | A1 | 1/2002 | Swartz | |
| 6,491,223 | B1 | 12/2002 | Longacre et al. | |
| 6,561,429 | B2 * | 5/2003 | Bryant et al. | 235/462.43 |
| 6,659,350 | B2 | 12/2003 | Schwartz et al. | |
| 6,708,887 | B1 | 3/2004 | Garrett et al. | |
| 6,899,273 | B2 | 5/2005 | Hussey et al. | |
| D512,427 | S | 12/2005 | Choi et al. | |
| 6,999,797 | B2 | 2/2006 | Crawford et al. | |
| 7,028,905 | B2 | 4/2006 | Sato et al. | |
| 7,175,094 | B2 | 2/2007 | Bhatia et al. | |
| 7,185,820 | B1 | 3/2007 | Schlieffers et al. | |
| 7,609,406 | B2 * | 10/2009 | Roth et al. | 358/1.15 |
| 2003/0222150 | A1 | 12/2003 | Sato et al. | |
| 2005/0017077 | A1 * | 1/2005 | Bhatia et al. | 235/462.45 |

* cited by examiner

*Primary Examiner* — Seung Lee

(57) ABSTRACT

A printer having a head and a handle are disclosed. In one embodiment, the handle has a convex side and a concave side. In another embodiment, the head is pivotable relative to the handle.

25 Claims, 6 Drawing Sheets

PRINTING DEVICE HANDLE

CROSS-REFERENCE TO RELATED PATENT APPLICATIONS

This application claims the benefit of U.S. provisional patent application Ser. No. 60/983,145, filed on Oct. 26, 2007, entitled "PRINTING DEVICE HANDLE". The present application is related to copending U.S. patent application Ser. No. 11/755,527 filed on May 30, 2007 by Gregory J. May, Anthony D. Studer, Gary G. Lutnesky and Kevin E. Swier and entitled MODULAR MARKING APPARATUS AND METHOD, the full disclosure of which is hereby incorporated by reference. The present application is related to copending U.S. patent application Ser. No. 11/833,825 filed on Aug. 3, 2007 by Anthony D. Studer, Mark T. Hardin and Karen A. St. Martin and entitled FLUID DELIVERY SYSTEM, the full disclosure of which is hereby incorporated by reference.

BACKGROUND

Pistol grip style handles are not well adapted for prolonged periods of use. Such handles may cause fatigue. Moreover, such handles do not generally accommodate different users and uses.

DETAILED DESCRIPTION OF THE EXAMPLE EMBODIMENTS

Figure 2:
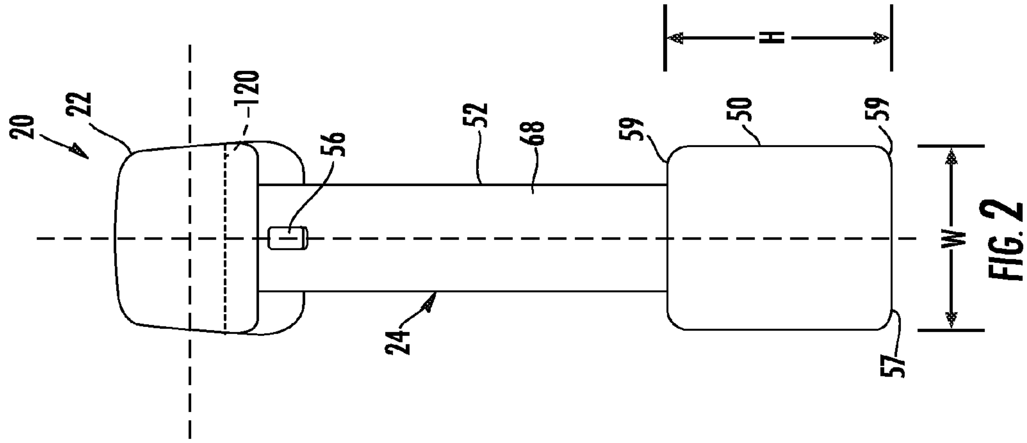
FIG. 2 is a rear elevational view of the printer of FIG. 1 according to an example embodiment.
Figure 1:
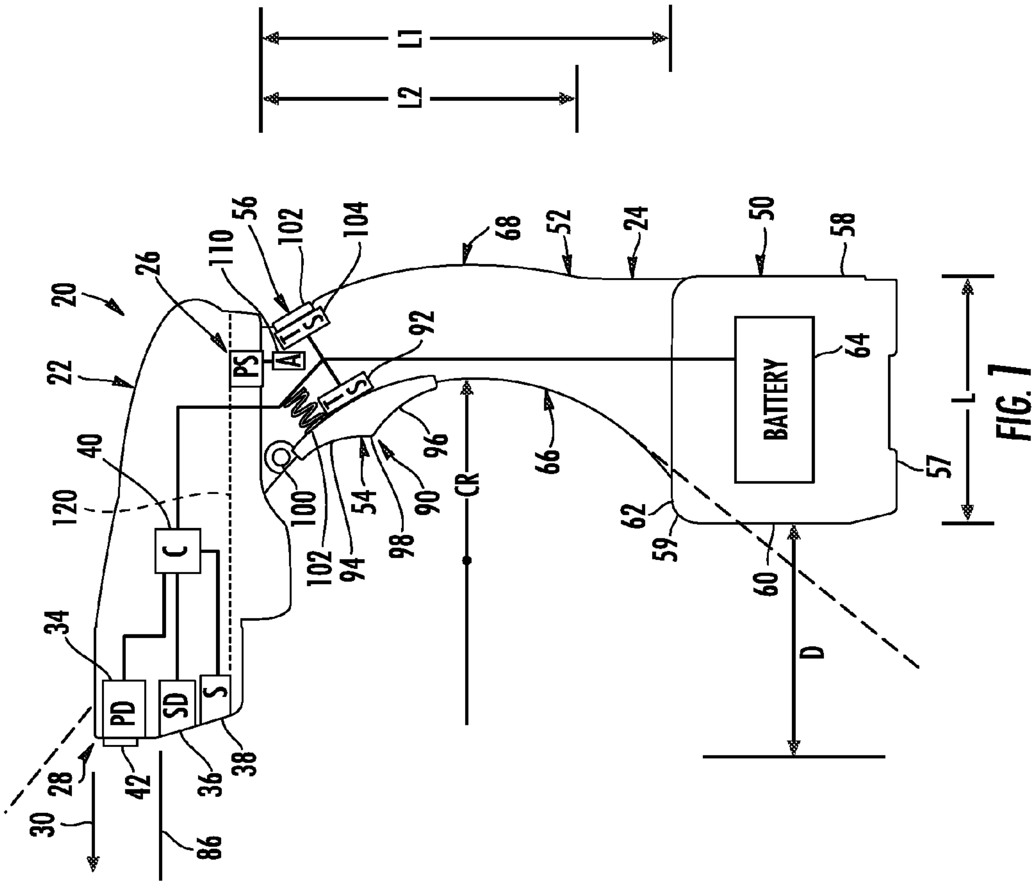
FIG. 1 is a site elevational view of a printer with portions schematically shown according to an example embodiment.

FIGS. 1 and 2 illustrate handheld printer 20 according to an example embodiment. Printer 20 is configured to be grasped and positioned by a person's hand while printing an image upon a surface. As will be described hereafter, printer 20 is configured to facilitate printing upon different surfaces at different heights or elevations while reducing discomfort and fatigue to a person positioning printer 20.

Printer 20 includes head 22, handle 24 and pivot support 26. Head 22 comprise that portion of printer 20 configured to perform printing. Head 20 has a nose portion 28 configured to be positioned opposite to the surface being printed upon during printing. Nose 28 extends from handle 24 in a forward direction as indicated by arrow 30.

As schematically shown by FIG. 1, head 22 includes print device 34, scanning device 36, sensor 38 and the controller 40, each of which is substantially housed or contained proximate to nose 28. Print device 34 comprises a mechanism configured to print or form an image upon a surface. In one embodiment, print device 34 includes one or more devices configured to apply a printing material to a surface. In one embodiment, print device 34 includes one or more drop-on-demand inkjet print heads configured to eject a fluid, such as ink, upon a surface. In other embodiments, print device 34 may comprise other mechanisms for ejecting, applying, or otherwise depositing printing material upon a surface.

In the example illustrated, print device 34 further includes a positioning and tracking member 42. Member 42 is configured to physically contact the surface being printed upon so as to closely nose 28 and the rest of print device 34 in close proximity to the surface being printed upon. Member 42 further serves as a bearing facilitating movement of nose 28 across the surface being printed upon. In addition, member 42 tracks movement of print device 34 and nose 28 across the surface being printed upon. Member 42 transmits electronic signals to controller 40 indicating the rate at which print device 34 is moved across the surface such that controller 40 may control the rate at which the print material is applied or deposited by print device 34.

According one embodiment, member 42 comprises an encoder wheel comprising a disk rotationally supported at nose 28 and having an outer circumferential surface configured to contact and roll along the surface being printed upon. Signals based upon the rotation of the disk indicate relative movement of print device 34 and nose 28 across the surface being printed upon. The signals are transmitted to controller 40. In other embodiments, member 42 may have other configurations.

Scanning device 36 comprises a device configured to sense and capture data from a surface. In one embodiment, scanning device 36 comprises an image, one or more illumination sources, such as targeted light emitting diode, facilitating omni-directional scanning in low light conditions. In one embodiment, scanning device 36 additionally is configured to emit a lit target image upon the surface to be sensed or scanned. In other embodiments, scanning device 36 may be comprised of a sensor to capture data from a visible image such as a two-dimensional (2-D) charge coupled device (CCD) or other forms of a camera and the like. In still other embodiments, scanning device 36 may utilize ultraviolet or infrared light to capture an image or data from an image upon a surface. For example, scanning device 36 may include a laser scanner or a radio frequency identification device (RFID) reader. Scanning device 36 may be configured to read a code such as a Maxi code, barcode, Universal product code (UPC) and the like. In yet other embodiments, scanning device 36 may be omitted.

Sensor 38 comprises a sensor configured to sense the distance between the surface to be printed upon by print device 34 or the distance between the surface having the image to be sensed or scanned by scanning device 36 and scanning device 36. In one embodiment, sensor 38 detects such a distance without contacting the surface to be scanner the surface to be printed upon. In one embodiment, sensor 38 comprises an ultrasonic circuit or sensor. One example of such an ultrasonic sensor is a 400ET080 Piezoelectric Sensor, commercially available from Pro-Wave Electronics Corp. located at 3rd Floor, No. 4, Lane 348, Section 2, Chung Shan Road, Chung Ho City, Taipei Hsien, Taiwan 235. In other embodiments, sensor 38 may comprise other ultrasonic sensors or may comprise other non-contact sensors such as infrared sensors. In still other embodiments, sensor 68 may comprise a sensor which contacts the surface when determining the separation distance. In other embodiments, sensor 38 may be omitted.

Controller 40 comprises one or more processing units configured to generate control signals correcting the operation of print device 34, scanning device 36 and sensor 38 based upon instructions contained in a memory and/or based upon instructions or input received from a person using printer 20. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 40 may be embodied as part of one or more application-specific integrated circuits (ASICs). Unless otherwise specifically noted, the controller is not limited to any specific combination of hardware circuitry and software, nor to any particular source for the instructions executed by the processing unit. Although controller 40 is illustrated as being incorporated into head 22, in other embodiments, controller 40 may alternatively be incorporated into handle 24.

Handle 24 comprises a pistol-type grip coupled to head 22 and configured to facilitate positioning of nose 28 and head 22 into close proximity (either in contact with or less than 3 mm) to the surface being printed upon by print device 34 during printing. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. Handle 24 facilitates printing upon different surfaces at different heights while reducing discomfort and fatigue to a person positioning printer 20. This is especially true for printing applications on horizontal surfaces of varying heights. Handle 24 includes base 50, neck 52, and triggers 54, 56.

Base 50 comprises that portion of handle 24 at a terminal end of handle 24 opposite had 22. Base 50 has dimensions such that a person's hand may wrap around base 50 to support printer 20. In particular, base 50 is configured such that the person's palm may abut against bottom 57 or back 58 of base 50 with his or her fingers wrapped about opposite portions of base 50. For purposes of this disclosure, when references are made to a person's hand and the dimensioning of portions of handle 24, such dimensions are chosen to accommodate a range of hand sizes extending from a 5% Asian female to a 95% Caucasian man as provided by Humanscale 4/5/6 Manual by Diffrient, Tilley & Harman, published by; The MIT Press, Massachusetts Institute of Technology, Cambridge, Mass. 02142, hereby incorporated by reference. In one embodiment, base 50 has a longitudinal length L of less than or equal to about 110 mm and nominally about 80 mm. Base 50 has a transverse width of less than or equal to about 110 mm and nominally about 60 mm. Base 50 has a height H of less than or equal to about 100 mm and nominally about 70 mm. To further facilitate gripping of handle 24 about base 50, the corners 59 of base 50 are rounded or smooth to provide a more comfortable grip.

As further shown by FIG. 1, base 50 has a front side 60 and a shoulder 62. Front side 60 is based from or retracted from a foremost surface of nose 28 by a distance D of at least about 25 mm and nominally about 65 mm. As a result, handle 24 provides clearance for a person gripping base 50 or neck 52 without handle 24 interfering with the article or other structure providing the surface being printed upon by print device 34.

Shoulder 62 extends from forward side of handle 24 adjacent to neck 52. Shoulder 62 provides a surface against which a lower edge of a person's hand may rest when gripping a lower portion of neck 52. In other embodiments, shoulder 62 may be omitted.

In one embodiment, base 50 is further configured to receive and contained a power source, such as a battery 64 (schematically shown), for supplying power to printer 20. In one embodiment, battery 64 may comprise a Lithium Ion or Lithium Polymer battery. In other embodiments, battery 64 may comprise a different type of battery. In other embodiments, base 50 may not house or contain a battery.

Neck 52 extends between-based 50 and head 22. As shown by FIG. 1, neck 52 includes a forward facing concave side 66 and a rearward facing side 68 generally opposite convex side 68. Sides 66 and 68 cooperate to provide opposing gripping surfaces about which a person's hand may wrap and hold printer 20. In particular, surface 66 is configured to be contacted by the bottom side of a person's fingers while surface 68 is configured to be contacted by the inside of a person's hand or palm. Surfaces 66 and 68 provide a person with a plurality of continuous different positions at which the person may grip neck 52 to position nose 28 and head 22 at a plurality of different angles with respect to the person's forearm and hand. As a result, surfaces 66 and 68 enable a person to grip handle 24 differently depending upon the positioning or height of the surface to be printed upon in the relative height of the person using printer 20.

Figure 3:
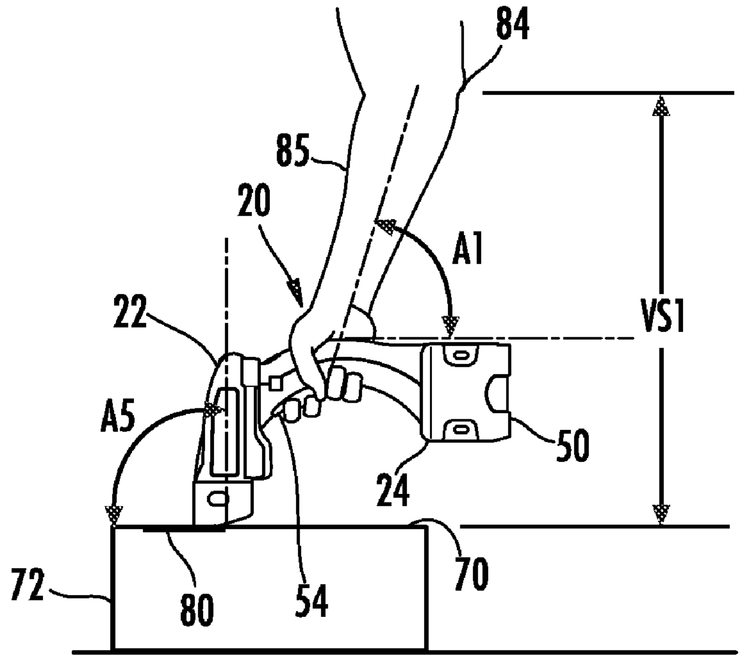
FIGS. 3-6 illustrate printing with printer upon surfaces at different elevations according to an example embodiment.

FIGS. 3-6 illustrate how surfaces 66 and 68 provide different gripping positions to facilitate printing upon different surfaces at different heights while reducing discomfort and fatigue to a person positioning printer 20. FIGS. 3-6 illustrate printer 20 being positioned in close proximity to top horizontal surfaces 70 of articles 72, 74, 76 and 78, respectively, while images 80 are printed upon surfaces 70. As shown by FIGS. 3-6, each of articles 72, 74, 76 and 78 either (1) themselves have different dimensions or (2) are supported at different elevations such that there respective surfaces 70 are at different heights with respect to the person using printer 20 to print images 80. In the example illustrated, articles 72-78 have surfaces 70 that are vertically spaced from the elbow 84 associated with the arm and hand the person holding printer 20 by vertical spacings VS1, VS2, VS3 and VS4, respectively. As a result, the person's forearm 85 general extends at angles A1, A2, A3 and A4 with respect to the horizontal or with respect to surface 70 as shown in FIGS. 3-6, respectively, while head 22 extends at an angle A5 which is substantially perpendicular to surface 70. As shown by FIG. 3, when surface 70 is vertically spaced from elbow 84 by distance VS1, the largest of the vertical spacings, handle 24 provides a gripping position in which the person's hand may wrap about an upper portion (as seen in FIGS. 1 and 2) of handle 24 which has a negative rake angle of between about −10 degrees and about −60 degrees and nominally about −43 degrees. As shown in FIG. 3, this enables print device 34 to be positioned in close proximity to surface 70 during printing while the person's wrist is in a neutral or near neutral position. In other words, the axis of the person's hand is substantially contiguous with or near contiguous with the axis of the person's forearm. Because the person does not need to substantially bend his or her wrist, printer 20 the manipulation and support of printer 20 is less fatiguing.

Figure 4:
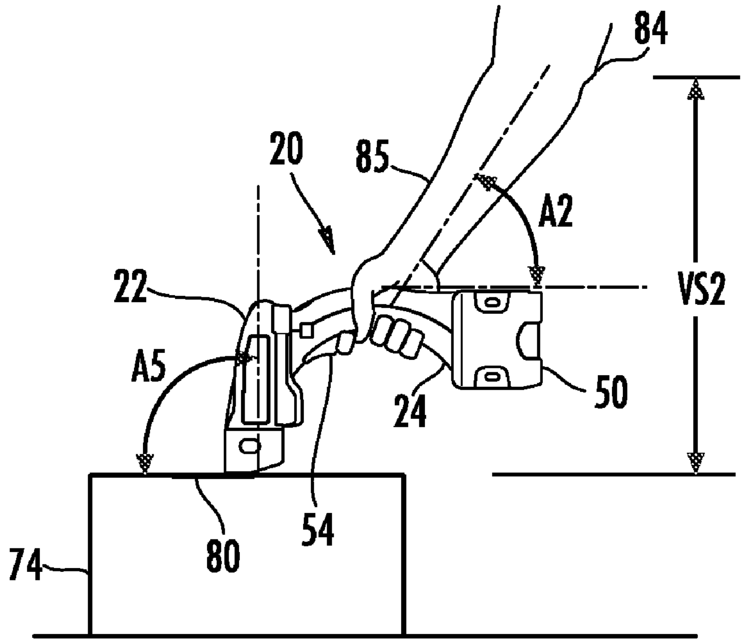

In FIG. 4, surface 70 of article 74 is spaced from elbow 84 by a smaller vertical spacing VS2. As noted above, this may be the result of article 74 being larger and taller or may be the result of surface 70 being supported at a higher elevation. If the entirety of handle 24 were at the same negative rake angle, the person gripping handle 24 would potentially have to bend his or her wrist and hand relative to his or her forearm to accommodate the smaller vertical spacing VS2 to position nose 28 in close proximity to surface 70 with nose 28 being substantially parallel to surface 70. Such twisting or bending of the wrist for prolonged periods of time could potentially promote fatigue. However, as shown by FIG. 4, handle 24 enables a person to reposition his or her hand further towards base 50 proximate a center of handle 24 where handle 24 has a relatively small rectangle (positive or negative) or is substantially perpendicular to axis 86 of the head 22 (shown in FIG. 1). This results in the person being able to maintain a neutral or substantially neutral wrist position (the axis of the person's hand is substantially contiguous with or near contiguous with the axis of the person's forearm, providing a more ergonomic and less fatiguing grip.

Figure 5:
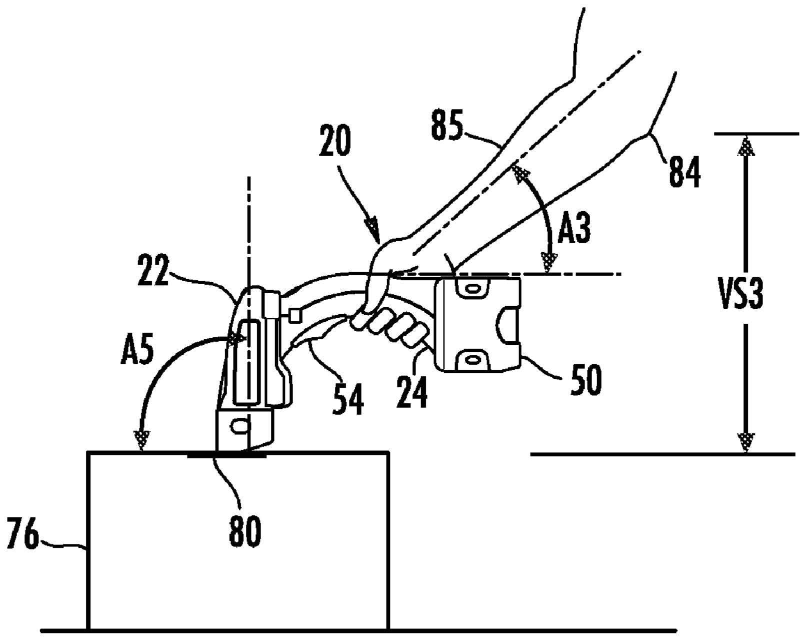

In FIG. 5, surface 70 of article 76 is spaced from elbow 84 by an even smaller vertical spacing VS3. If the entirety of handle 24 were at the same negative rake angle as in FIG. 3 or the de minimis rake angle or zero rake angle as shown in FIG. 4, the person gripping handle 24 would potentially have to bend his or her wrist and hand relative to his or her forearm to accommodate the smaller vertical spacing VS3 to position nose 28 in close proximity to surface 70 with nose 28 be substantially parallel to surface 70. Such twisting or bending of the wrist or prolonged periods of time could potentially promote fatigue. However, as shown by FIG. 5, handle 24 enables a person to reposition his or her hand further towards shoulder 62 of base 50 near the end of neck 52 where handle 24 has a larger positive rake angle. This results in the person being able to maintain a neutral or substantially neutral wrist position (the axis of the person's hand is substantially contiguous with or near contiguous with the axis of the person's forearm), providing a more ergonomic and less fatiguing grip.

Figure 6:
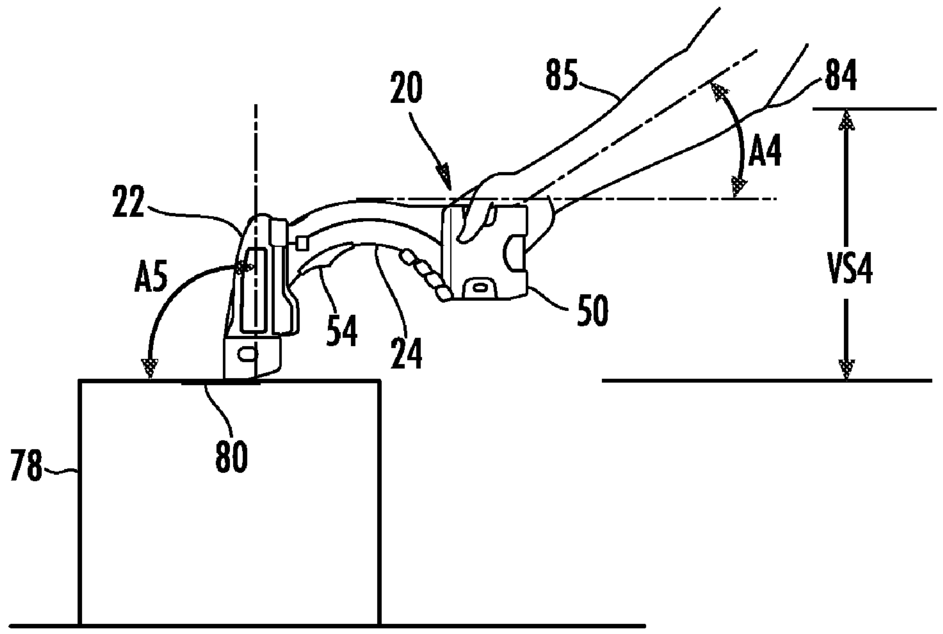

Lastly, in FIG. 6, surface 70 of article 78 is spaced below elbow 84 by an even smaller vertical spacing VS4 or is actually above elbow 84. As noted above, this may be the result of article 78 being larger and taller or may be the result of surface 70 being supported at a higher elevation. If the entirety of handle 24 were at any of the other angles shown in FIG. 3-5, the person gripping handle 24 would potentially have to bend his or her wrist and hand relative to his or her forearm to accommodate the smaller vertical spacing VS4 to position nose 28 in close proximity to surface 70 with nose 28 be substantially parallel to surface 70. Such twisting or bending of the wrist or prolonged periods of time could potentially promote fatigue. However, as shown by FIG. 6, handle 24 enables a person to reposition his or her hand around base 50, with the person's palm placed against rear 58 or bottom 57 of base 50. This results in the person being able to maintain a neutral or substantially neutral wrist position (the axis of the person's hand is substantially contiguous with or near contiguous with the axis of the person's forearm), providing a more ergonomic and less fatiguing grip. Thus, handle 24 provides multiples distinct gripping angles (negative rake, de minimis or zero rake, and positive rake) with respect to head 22 to accommodate printing upon differently sized articles or articles supported at different elevations with reduced user fatigue.

According to one example embodiment, concave side 66 has a curvature radius of between about 50 mm and about 100 mm, and nominally about 74 mm. The curved portion of convex side 68 has a curvature radius of between about 60 mm and about 160 mm, and nominally about 110 mm. Neck 52 has a length L1 of at least about 75 mm, less than about 156 mm and nominally about 128 mm. The curved portion of convex side 68 comprises a majority of convex side 68 and has a length L2 of at least about 50 mm, less than about 156 mm and nominally about 100 mm. Such dimensions accommodate differently sized hands and provide a sufficient number of differently angled grips to accommodate a sufficient number of different printing surface elevations. In other embodiments, neck 52 may have other dimensions.

Triggers 54 and 56 comprise user interfaces by which a person may import instructions or commands to printer 20. Trigger 54 enables a person using printer 20 to control the time at which printer 20 initiates an operation, such as the time at which printer 20 initiates printing with print device 34 and/or initiates scanning with scanning device 36. As shown by FIG. 1, trigger 54 comprises a manual trigger including trigger button 90 and a trigger switch 92. Trigger button 90 extend along concave side 66 of neck 52 and provides contactable surfaces which may be pressed by one or more fingers of a user. Trigger button 90 includes upwardly facing surface 94 (towards head 22 as seen in FIG. 1) and a downwardly facing surface 96 (towards base 50 as seen in FIG. 1) which are separated by an apex 98. Trigger button 90 is pivotally coupled to handle 24 at pivot point 100 proximate to an upper end of upwardly facing surface 94. Upon being pivoted about pivot point 100 against a bias provided by spring 102, trigger button 90 actuates trigger switch 92.

Because trigger button 90 pivots about pivot point 100 proximate an upper end of surface 94, trigger button 90 may pivot into engagement with trigger switch 92 when either surface 94 or surface 96 is pressed upon. As a result, trigger button 90 further facilitates multiple gripping positions along handle 24. In particular, when printing upon surface 70 of article 72 (shown in FIG. 3), a person or user may grip an upper portion of handle 24 with his or her index finger extending around and across surface 94, whereby the person may use his or her index finger to actuate trigger 54. When printing upon surface 70 of article 74 (shown in FIG. 4) a person or user may grip a more central portion of handle 24 with his or her index finger positioned against and across surface 96 of trigger button 90. In either gripping position, trigger button 90 may be pivoted against trigger switch 92 such that trigger switch 92 generates signals which are transmitted to controller 40 which cause controller 40 to initiate printing and/or scanning.

Trigger 56 comprises a user interface configured to actuate printer 22 in automatic mode of operation in which printing and/or scanning is automatically initiated without depressment of trigger button 90. Trigger 56 facilitates use of gripping positions along handle 24 where a person may not be able to reach and depress trigger button 90. For example, when gripping handle 24. Lower end of neck 52 or about base 50, such as when printing is being performed upon services 70 of articles 76 and 78 (shown in FIGS. 5 and 6), the person's hand may not be able to reach trigger button 90. Actuation of trigger 56 causes controller 40 to operate in an automatic mode in which printing and/or scanning is initiated automatically based upon signals received from sensor 38.

In the example illustrated, trigger 56 includes a trigger button 102 and a trigger switch 104. Trigger button 102 is located along convex side 68 of handle 24 proximate to head 22. In this location, trigger button 102 may be quickly and easily depressed, slid, moved or otherwise actuated by a person's thumb while gripping handle 24 when the person anticipates or sees that a lower gripping position such as shown in FIGS. 5 and 6 will be used shortly. In other embodiments, trigger button 56 may be provided at other locations along handle 24 or may alternatively be provided as part of head 22. Such movement of trigger button 56 actuates trigger switch 104 which transmits a signal to controller 40 causing controller 40 to operate in the automatic mode as described above.

Figure 9:
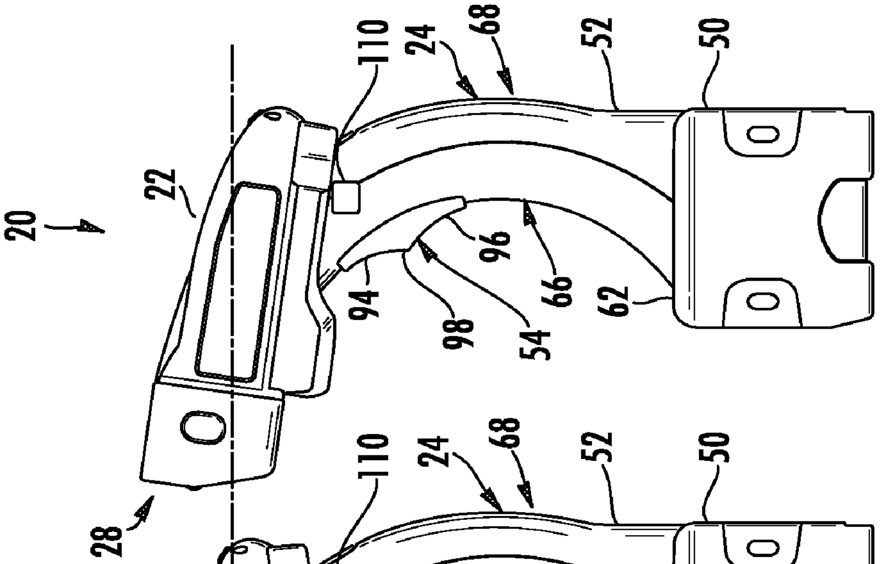
FIGS. 7-9 illustrate a head of the printer of FIG. 1 in different orientations with respect to a handle of the printer according to an example embodiment.
Figure 8:
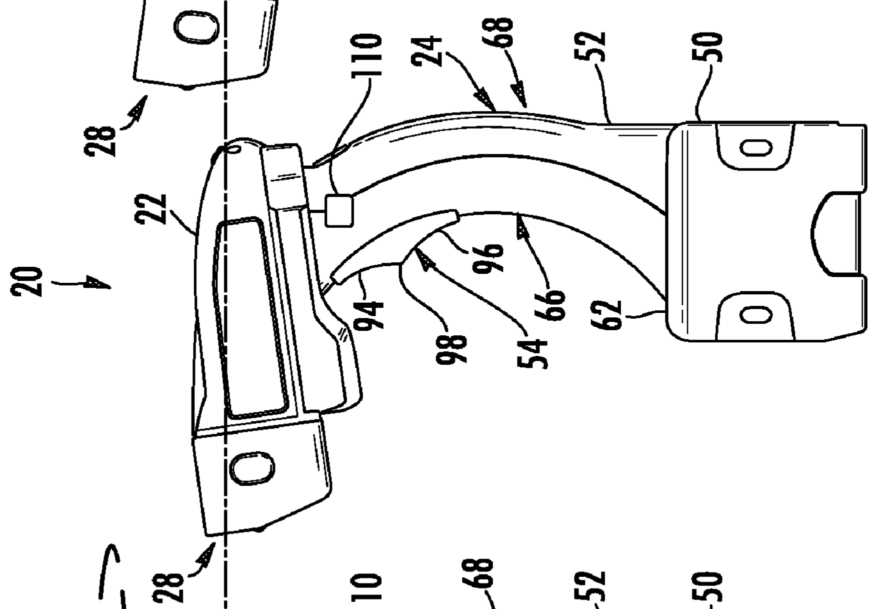
Figure 7:
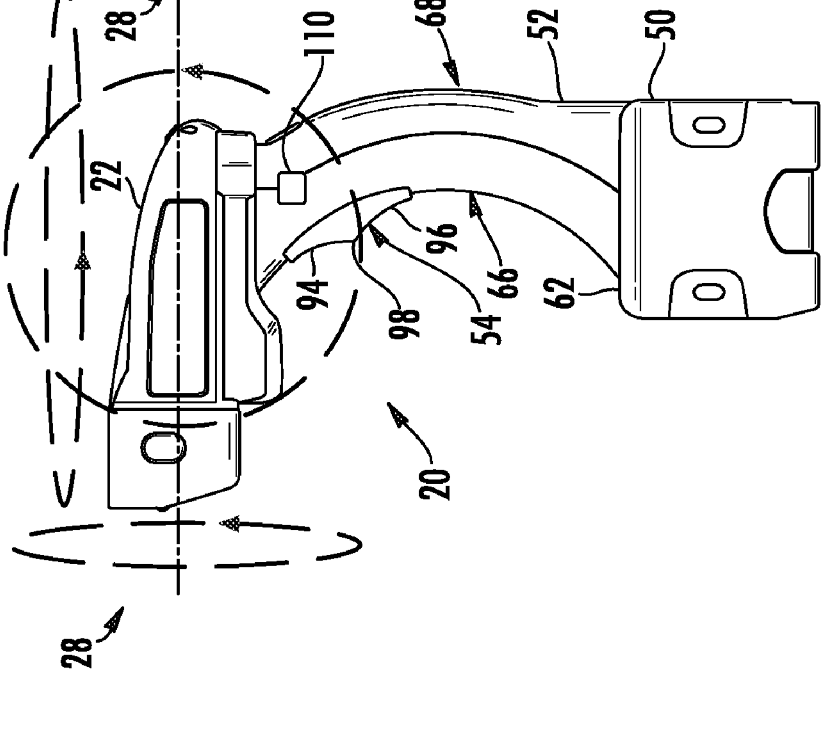

Pivot support 26 comprises a mechanism configured to facilitate rotation or pivotal movement of head 22 relative to handle 24. As shown by FIGS. 7-9, in one embodiment, pivots support 26 facilitates pivotal movement of head 22 in at least three orthogonal axes with respect to handle 24. As a result, the relative positioning of head 22 with respect to handle 24 may be selectively adjusted by a person using printer 20 to accommodate his or her particular attributes. For example, head 22 may be rotated to a first position for a left-handed person into a second distinct position for a right-handed person. Adjustments may also be made to accommodate different applications or environments in which the surface being printed upon is that unique angles or orientations with respect to printer 20 and the person manipulating printer 20.

As further shown by FIG. 1 and FIGS. 7-9, pivot support 26 may be configured to retain head 22 at a particular orientation with respect to handle 24. In one embodiment, pivot support 26 may be associated with an actuator 110 which upon being depressed, rotated, translated or otherwise moved, releases head 22 from the maintained position and once again permits head 22 to rotate about one or more axes to a new orientation with respect to handle 24. In one embodiment, actuation of actuator 110 permits head 22 to float to any position, wherein the person may manually reposition head 22 or may press head 22 against a surface being printed upon to appropriately orient head 22 for contact or near contact with a surface being printed upon. In another embodiment, actuation of actuator 110 releases head 22, wherein one or more resilient bias head 22 to a default orientation with respect to handle 24. In such an embodiment, head 22 may be adjusted from the default position to a new position by applying force to head 22 against the bias such as by manually repositioning head 22 or by pressing head 22 with sufficient force against a surface, such as a surface to be printed upon.

According one embodiment, pivot support 26 may comprise a universal joint, such as a ball and socket joint with an associated squeeze or clamp that is actuatable between a clamping position and a releasing position via actuator 110. In another embodiment, pivot support 26 may comprise a 3-axis ratchet assembly. Although actuator 110 is illustrated as being located along a side of handle 24, facilitating actuation with a person's thumb while gripping handle 24, in other embodiments, trigger 110 may be provided at other locations. In some embodiments, actuator 110 may be omitted, wherein head 22 automatically retains a selected orientation with respect to handle 24 unless a sufficient force exceeding a predetermined threshold is applied to head 22 to reposition or reorient head 22. In yet other embodiments, pivot support 26 and actuator 110 may both be omitted, where head 22 has a fixed or stationary orientation with respect to handle 24.

As further shown by broken lines in FIGS. 1 and 2, in particular embodiments, head 22 may be configured to be removably coupled or removably mounted to handle 24. As a result, head 22 may be used as a handheld unit absent handle 24. In one embodiment, handle 24 may additionally include a deck 120 configured to removably secure head 22 to handle 24 and to provide one or more communication interfaces between controller 40 or other components in head 22 and user inputs, such as triggers 54 and 56, associated with handle 24. In such an embodiment, pivot support 26 may be provided between neck 50 to handle 24 and deck 120. As noted above, in other embodiments, pivot support 26 may be omitted, wherein deck 120 would be stationarily fixed to neck 52 of handle 24.

Figure 10:
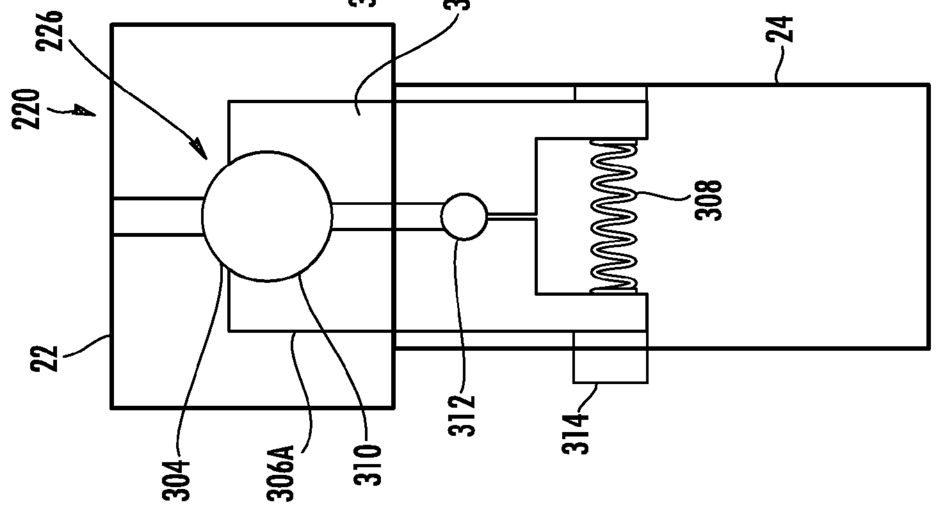
FIGS. 10-12 schematically illustrate another embodiment of the printer of FIG. 1 with a head of the printer reoriented with respect to the handle of the printer according to an example embodiment.
Figure 11:
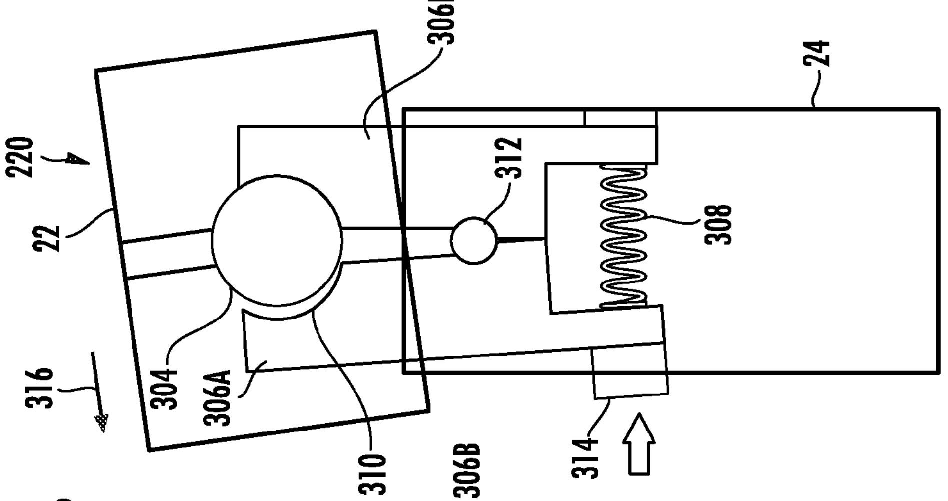
Figure 12:
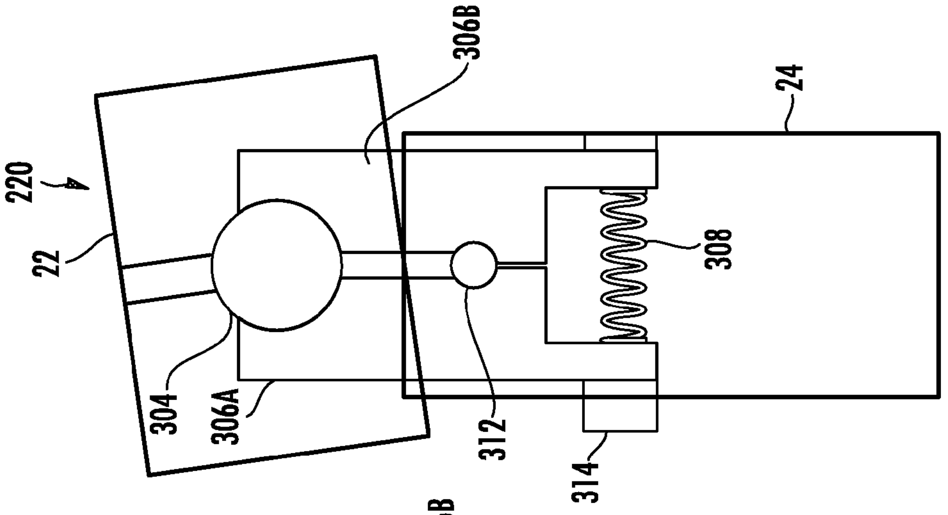

FIGS. 10-12 schematically illustrate printer 220, another embodiment of printer 20 shown in FIGS. 1-9. Printer 220 is similar to printer 20 in substantially all respects except that printer 220 specifically includes pivot support 226, an example of pivot support 26. As shown by FIG. 10, pivot support 226 includes ball 304, socket portions 306A, 306B (collectively referred to as socket portions 306) and bias 308. Ball 304 comprises a spherical member fixedly secured or coupled to head 22 and at least partially received within a socket 310 formed between socket portions 306.

Socket portions 306 comprise two or more members which collectively engaged ball 304 on multiple sides of ball 304. In the example illustrated, pivot support 226 includes a pair of opposite socket portions 306A and 306B which engaged opposite sides of ball 304. Socket portions 306 actuate or move between a clamping position (shown in FIGS. 10 and 12) and a releasing position (shown in FIG. 11). In the particular example illustrated, socket portions 306 pivot about a hinge 312 between the clamping position and the releasing position. In other embodiments, socket portions 306 may move in other fashions between the clamping position and the releasing position.

In the clamping position, socket portions 306 contact and frictionally engage ball 304 so as to inhibit or prevent relative movement between all 304 and socket portions 306. As a result, the orientation of ball 304 and head 22 are maintained. In the releasing position, socket portions 306 are sufficiently spaced from one another so as to either be out of contact with ball 304 or so as to apply a lower frictional force against ball 304 such that ball 304 remains captured within socket portions 306 but is movable or rotatable. As a result, ball 304 and head 22 may be rotated and reoriented with respect to handle 24.

Bias 308 comprises one or members configured to resiliently bias or urge socket portions 306 to the clamping position. In the example illustrated, bias 308 comprises a compression spring captured between socket portions 306 on an opposite side of hinge 312 as ball 304. As a result, bias 308 urges socket portions 306A and 306B towards one another and against ball 304 to the clamping position. In other embodiments, bias 308 may comprise other springs at other locations. For example, and another about, bias 2308 may comprise a tension spring connected to socket portions 306 on the same side of hinge 312 as ball 304.

As further shown by FIG. 10, pivot support 226 is associated with actuator 314. Actuator 314 is similar to actuator 110 (shown in FIG. 1). Actuator 314 comprises a pushbutton operably coupled to one or more of socket portions 306. In the example illustrated, actuator 314 is directly connected to one of socket portions 306. As shown by FIG. 11, depressment of actuator 314 pivots socket portion 306A about hinge 312 in a counter-clockwise direction against the bias force of bias 308 (compressing bias 308) to retract socket portion 306A away from ball 304 and away from socket portion 306B. As a result, ball 304 and head 22 may be reoriented relative to handle 24. Although head 22 is illustrated as being reoriented in the direction indicated by arrow 316, head 22 may additionally or alternatively be reoriented about other axes as well.

Once a desired orientation has been established, actuator 314 may be released. As a result, as shown by FIG. 12, bias 308 returns socket portion 306A to its original position towards socket portion 306B and in engagement with ball 304. Consequently, the new orientation of head 22 is maintained until depressment of actuator 314. In some embodiments, the biasing force provided by bias 308 may be established such that ball 304 may be rotated within the socket 310 to reorient head 22 when a sufficient force threshold is exceeded by the applied force to head 22 without depressment of actuator 314. The force threshold is large enough such that force exerted upon head 22 during printing is insufficient to overcome the threshold and to move head 22. In such an embodiment, actuator 314 may be omitted.

Figure 13:
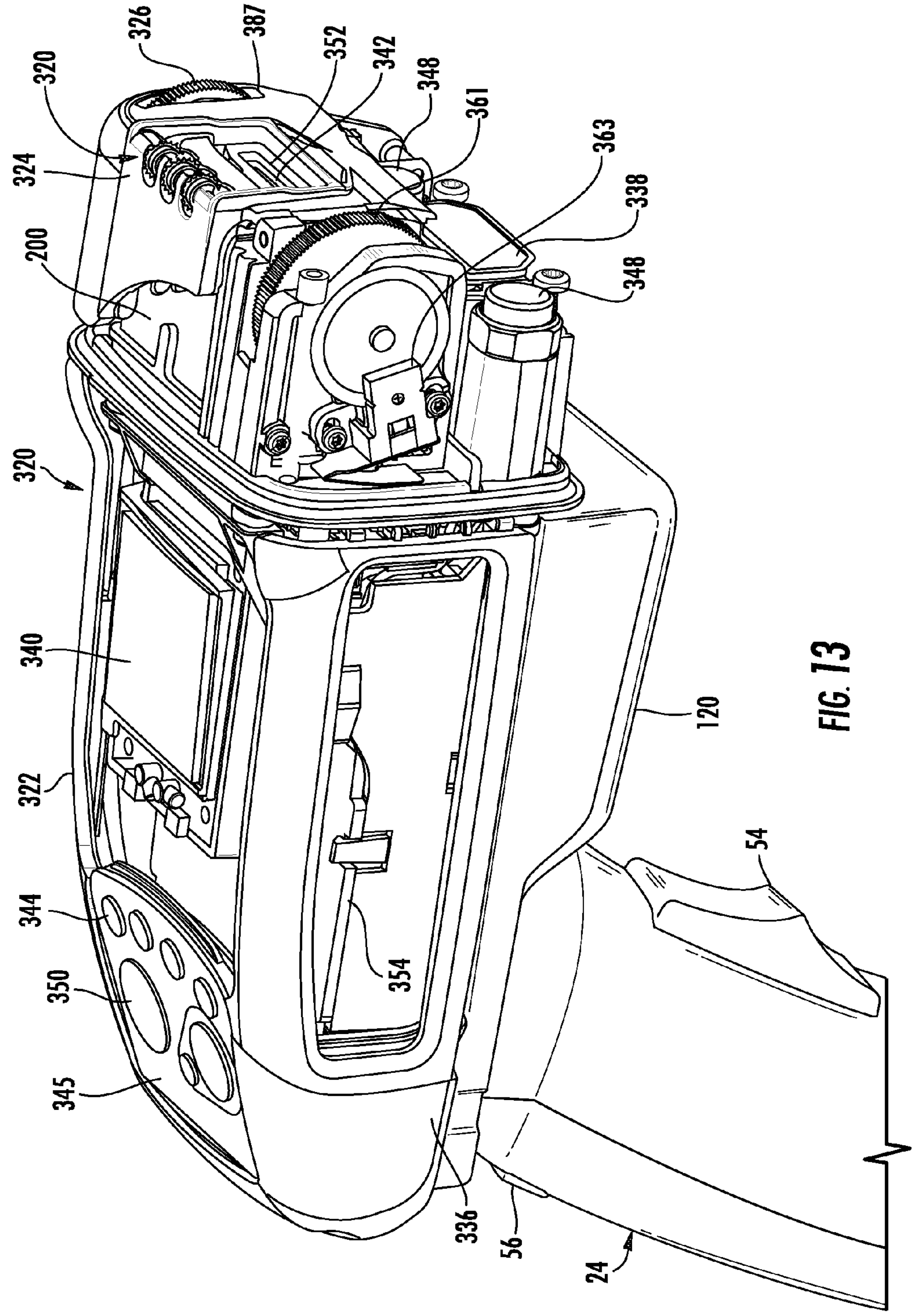
FIG. 13 is a fragmentary top perspective view of another embodiment of the printer of FIG. 1 according to an example embodiment.

FIG. 13 illustrates printer 320, another embodiment of printer 20. Printer 320 is attached identical to printer 220 except that printer 320 specifically includes head 322, a particular embodiment of head 22. The remaining components of printer 320 which correspond to printer 220 and printer 20 are numbered similarly. As shown by FIG. 13, printer 320 specifically includes deck 120 (as described above) which removably receives and interfaces with head 322.

Head 322 includes body 336, scanning device 338, communication interface 340, indicator 344, user interface 345, print sensor 346, sensor 348, manual trigger 350 and controller 354. Body 336 comprises a structure or case configured to support the remaining components of head 320. Body 336 at least partially encloses or houses such components. In one embodiment, body 336 is configured such that capture and print unit 330 is a hand held unit. As shown in FIG. 12, body 336 is a block, cylinder or similar structure configured to be grasped by a person's hand with the person's fingers wrapped about body 336. In the particular embodiment illustrated, body 336 is formed from a thermally conductive material such as a metal (e.g. magnesium) to enhance cooling of internal componentry of capture and print unit 330. In other embodiments, body 336 may be formed from other materials such as plastic materials or combinations of plastics, metals or other materials.

Scanning device 338, also known as an imager, is configured to sense, scan or capture an image upon a surface. In one embodiment, scanning device 338 comprises a scanner module comprising a two dimensional (2D) Imaging Scanner and one or more illumination sources such as targeted light emitting diodes, facilitating omni-directional scanning a in low light conditions. In other embodiments, scanning device 338 may comprise other devices configured to sense or capture the visible image such as other forms of a camera or other two dimensional (2D) charge coupled devices (CCD) and the like. In yet other embodiments, scanning device 338 may utilize ultraviolet or infrared light to scan or sense an image on surface. In one embodiment, scanning device 338 may be configured to read a code such as a Maxi code, barcode, Universal Product Code (UPC) and the like.

Communication interface 340 is configured to communicate with external electronic devices such as external data sources (not shown). Communication interface 340 is configured to transmit data as well as to receive data. In one embodiment, communication interface 340 is configured to communicate wirelessly with external electronic devices. For example, in the particular embodiment illustrated, communication interface 340 is configured to communicate with radio waves and comprises wireless IEEE 802.11g module. In such an embodiment, the metallic housing of body 336 enhances cooling and dissipation of the heat generated by communication interface 340. In other embodiments, communication interface 340 may communicate with ultraviolet or infrared light. In still other embodiments, communication interface 340 may be a wired connection where communication occurs through electrical or optical cables. In other embodiments where a data source is incorporated into head 322 as part of controller 354 and its memory, communication interface 340 may be omitted.

Indicator 344 comprises one or more devices configured to provide an indication of when print device 342 is ready for printing. Indicator 344 further provides an indication of when image capture has been initiated and when capture and print unit 330 is in sufficiently close proximity to a surface for printing upon the surface. In the embodiment illustrated, indicator 344 comprises a plurality of light emitting diodes configured to emit different colors of light or configured to emit light which is filtered by different colored light filters, wherein the different colors of light indicate or communicate different information to a person using printer 320. In other embodiments, indicator 344 may have other configurations. For example, indicator 344 may additionally or alternatively be configured to provide distinct audible signals or sounds based on the state of printer 320. In yet other embodiments, indicator 344 may be omitted.

User interface 345 comprises an interface by which a person may enter commands instructing capture and print unit 330 to initiate printing with print device 342. For example, upon receiving an indication that print device 342 is at an appropriate temperature for printing from indicator 344, a person may actuate or otherwise enter a command via interface 345 to begin printing. In the example embodiment illustrated, user interface 345 comprises a pair of buttons. When depressed manually actuates switches to create electoral signals which are transmitted to controller 354. In other embodiments, interface 345 may comprise a touch pad, lever, switch, slide or other device by which a person may use his or her hands or fingers to enter a command. In another embodiment, user interface 345 may comprise a microphone with associated voice or speech recognition software. In yet other embodiments, user interface 345 may be omitted where other mechanisms are employed for initiating printing. For example, in one embodiment, printing may be initiated in response to signals received from print sensor 346.

Print sensor 346 comprises a sensing device configured to detect relative movement of printer 320, and in particular, print device 342, relative to a surface being printed upon. Signals from print sensor 346 indicate the relative speed at which print device 342 is moving relative to the surface being printed upon or vice versa. Signals from print sensor 346 are used by controller 354 to control the rate at which printing material is discharged from print device 342 and which particular nozzles are being discharged to form an image. In the particular embodiment illustrated, print sensor 346 is further configured to indicate contact or sufficiently close proximity of print device 342 to the surface and the initiation of printing. In other embodiments, the initiation a printing may alternatively begin in response to actuation of a separate trigger such as to the use of interface 345.

In the example embodiment illustrated, print sensor 346 comprises an encoder wheel 361 and associated encoder 363 wherein the encoder wheel 361 is rotated a long the surface being printed upon. In other embodiments, print sensor 346 may comprise a navigational sensor or other sensing device.

Sensor 348 comprises a device configured to sense an image separation distance between the surface having an image and sensor 348 or scanning device 338. Sensor 348 generates and transmits signals to controller 354, wherein controller 354 determines an image separation distance using such signals and generates a warming signal initiating the capture of an image by scanning device 338 and readying of print device 342.

According to one embodiment, sensor 348 detects the image separation distance without contacting the surface being printed upon. In one embodiment, sensor 348 comprises an ultrasonic circuit or sensor. As shown by FIG. 13, in the embodiment illustrated, sensor 348 comprises a pair of ultrasonic ranging sensors located on either side of scanning device 338 for enhanced detection of image separation distance separating the surface to be scanned for an image and scanning device 338. In other embodiments, sensor 348 may comprise other ultrasonic sensors or may comprise other non-contact type sensors such as infrared sensors. In still other embodiments, sensor 348 may comprise a sensor which contacts the surface being scanned or read when determining the image separation distance.

Manual trigger 350 comprises a user or human interface configured to permit a user or person to initiate the generation of a trigger signal. In one embodiment, manual trigger 350 may be configured to generate a trigger signal in response to contact with or force exerted by a person's hand or one or more fingers. For example, manual trigger 350 may comprise a button, slide, trigger structure or other structure.

Controller 354 comprises one or more processing units physically associated with printer 320 and configured to generate control signals directing operation of scanning device 338 and print device 342. In the particular example illustrated, controller 354 receives signals via encoder wheel 361 during manual movement of unit 330 across the surface being printed upon. Based upon the relative movement, controller 354 generates control signals controlling what particular nozzles of print device 342 are fired and the rate at which they are fired to eject ink or other printing material through opening 352 and onto the surface opposite to print device 342.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:

a head comprising:

a nose facing in a first direction;

a scanning device; and a printing device; and a handle extending from the head, the handle having a concave first side facing in the first direction and a convex rear side facing in a second opposite direction, wherein the head is movably coupled to the handle between a first position and a second position about an axis substantially perpendicular to a plane containing the head and the handle.

2. The apparatus of claim 1, wherein the head is resiliently biased to the first position.

3. The apparatus of claim 1, wherein the printing device includes an encoder wheel configured to be rotated along a surface being printed upon by the printing device.

4. The apparatus of claim 1, wherein one of the head and the handle includes a socket and the other of the head and a handle includes a ball rotatably received within the socket, wherein the socket is actuatable between a clamping position in which the socket retains the ball against movement and a releasing position permitting the ball to rotate within the socket and wherein the socket is resiliently biased towards the clamping position.

5. The apparatus of claim 4, further comprising a user interface along the handle configured to actuate the socket to the releasing position.

6. The apparatus of claim 1 further comprising a trigger having an upwardly facing surface and a downwardly facing surface and wherein the trigger is pivotally coupled to the handle between the upwardly facing surface and the head.

7. The apparatus of claim 1, wherein the handle has a base configured to contain one or more batteries and wherein the concave first side extends from the head to the base.

8. The apparatus of claim 4, wherein the convex second side extends from the head portion over a majority of a distance between the head and the base.

9. The apparatus of claim 1 further comprising a trigger lock on the convex second side of the handle.

10. The apparatus of claim 1, wherein the concave first side has a curvature radius of between about 50 mm and about 100 mm.

11. The apparatus of claim 1, wherein the convex second side has a curvature radius of between about 60 mm and about 160 mm.

12. The apparatus of claim 1, wherein the head is configured to pivot about three orthogonal axes with respect to the handle.

13. The apparatus of claim 1, wherein the convex second side of the handle has a length substantially perpendicular to the head of the least about 50 mm.

14. The apparatus of claim 1, wherein the concave first side of the handle has a length substantially perpendicular to the head of the least about 75 mm.

15. The apparatus of claim 1, wherein the concave first side and the convex second side have substantially a same center of radius.

16. An apparatus comprising:

a head including a printing device including an encoder wheel configured to be rolled along a surface being printed upon; and a handle movably coupled to the head and configured to pivot relative to the head about at least three axes.

17. The apparatus of claim 16, wherein the head includes a scanning device.

18. A method comprising:

pressing a head including a printing device against a surface while grasping a handle coupled to the head, wherein the head rotates relative to the handle; and printing upon the surface.

19. The method of claim 18, wherein the handle has a concave forward facing side and a convex rear facing side.

20. An apparatus comprising:

a head comprising:

a nose facing in a first direction;

a scanning device; and a printing device configured to print directly upon a surface supported independent of the head; and a handle extending from the head, the handle having a concave first side facing in the first direction and a convex rear side facing in a second opposite direction.

21. The apparatus of claim 20, wherein the concave first side has a curvature radius of between about 50 mm and about 100 mm and has a length substantially perpendicular to the head of the least about 75 mm and wherein the convex second side has a curvature radius of between about 60 mm and about 160 mm and has a length substantially perpendicular to the head of the least about 50 mm.

22. The apparatus of claim 20 further comprising a trigger having an upwardly facing surface and a downwardly facing surface and wherein the trigger is pivotally coupled to the handle between the upwardly facing surface and the head.

23. The apparatus of claim 20, wherein the handle has a base configured to contain one or more batteries and wherein the concave first side extends from the head to the base.

24. The apparatus of claim 20, wherein the concave first side and the convex second side have substantially a same center of radius.

25. The apparatus of claim 20, wherein the printing device includes an encoder wheel configured to be rotated along the surface being printed upon by the printing device.

* * * * *

UNITED STATES PATENT AND TRADEMARK OFFICE

CERTIFICATE OF CORRECTION

PATENT NO. : 8,267,323 B2
APPLICATION NO. : 12/248387
DATED : September 18, 2012
INVENTOR(S) : Anthony D. Studer et al.

It is certified that error appears in the above-identified patent and that said Letters Patent is hereby corrected as shown below:

In column 12, line 40, in Claim 13, before “least” delete “the” and insert -- at --, therefor.

In column 12, line 43, in Claim 14, before “least” delete “the” and insert -- at --, therefor.

In column 13, line 7, in Claim 21, before “least” delete “the” and insert -- at --, therefor.

In column 13, line 10, in Claim 21, before “least” delete “the” and insert -- at --, therefor.

Signed and Sealed this
Twelfth Day of February, 2013

Teresa Stanek Rea
*Acting Director of the United States Patent and Trademark Office*